Oct. 17, 1950 M. JOYCE 2,525,909

AUTOMATIC TELEPHONE DIALING INSTRUMENT

Filed Nov. 5, 1947

Inventor

MAURICE JOYCE

By Samuel Slomitz

ATTORNEY

Patented Oct. 17, 1950

2,525,909

UNITED STATES PATENT OFFICE 2,525,909

AUTOMATIC TELEPHONE DIALING INSTRUMENT

Maurice Joyce, Washington, D. C.

Application November 5, 1947, Serial No. 784,192

9 Claims. (Cl. 179—90)

This invention relates to an attachment for an automatic telephone transmitter and more particularly to a manually operated dialing device therefor.

This application is a continuation-in-part of my applications Serial No. 719,586, filed December 31, 1946, now abandoned, and Serial No. 757,561, filed June 27, 1947, now abandoned.

It is the object of the present invention to provide an improved attachment for an automatic telephone transmitter which may be molded from plastic materials and assembled in a manner to provide an economical and rugged attachment for such transmitters, so that the dialing may be performed therewith without need for use of the fingers engaging the openings in the rotatable dial forming part of said transmitters.

It is the object of the present invention to provide an attachment for an automatic telephone transmitter which may be mounted and dismounted very quickly and conveniently and one which requires no modification of the standard instruments to which the same are applied.

It is a further object of the invention to provide an attachment for dial-type telephone transmitters which is pleasing and ornamental in appearance and which does not impede the visibility of the indicia of numerals and letters on such transmitters which are necessary to see in the course of performing the dialing operations.

It is another object of the invention to incorporate an effective advertising medium in the attachment which in consequence of the attractive and pleasing form of the attachment will direct the telephone user's attention to the advertising every time that the telephone is operated.

It is a further object of the invention to provide an attachment which is adapted to fabrication by plastic molding techniques in the most economical manner to produce an attractive and commercially appealing item. The assembly makes use of metal parts where such are desirable for reasons of strength or economy, to produce a structure which is capable of giving a long useful life of service without deterioration or break-down.

The invention proceeds upon the principle of mounting a molded plastic shell upon the central cap of a conventional rotatable dial of an automatic telephone transmitter, which shell is maintained in place on the centrally disposed portion or cap of the dial plate by means of a frictional fit. A boss extends upwardly from the plastic shell for the purpose of pivotally mounting an articulated arm thereon, the free end of which is provided with a projection which normally extends resiliently above the level of the rotatable dial plate, but which may be pressed into one of the openings therein upon the exertion of pressure on a handle at the free end of the arm so that the subsequent rotation of the arm causes a rotary movement of the dial to an extent corresponding to the location of the opening into which the projection was inserted relative to the fixed stop against which the arm strikes at the conclusion of the impelling operation. Thereafter, a release of the free end of the arm and a consequent rising thereof permits the dial to return to its original position during which period the desired electrical impulses are transmitted to the central telephone exchange.

The molding of the assembly from plastic resins makes possible a wide range of ornamental effects. This is particularly true when styrene resins are used, in which case all colors ranging from crystal clear transparencies through the entire spectrum of jewel colors, as well as beautiful translucents and opaques may be obtained. By using transparent parts, an effective advertising medium can be combined with the attachment in order to place before the telephone user at all times desired information such as the name of a product or establishment, its telephone number, or any other desired indicia.

While mechanical dialing arrangements have been devised previously for attachment to automatic telephone transmitters for use in lieu of the fingers or other instrumentalities, such devices have not embodied the novel features of the instant invention.

Other objects and purposes will appear from the detailed description of the invention following hereinafter, taken in conjunction with the accompanying drawing, wherein Fig. 1 is a front view of an automatic telephone transmitter having the attachment in accordance with the present invention applied thereto in a plan view;

Figures 1, 2:
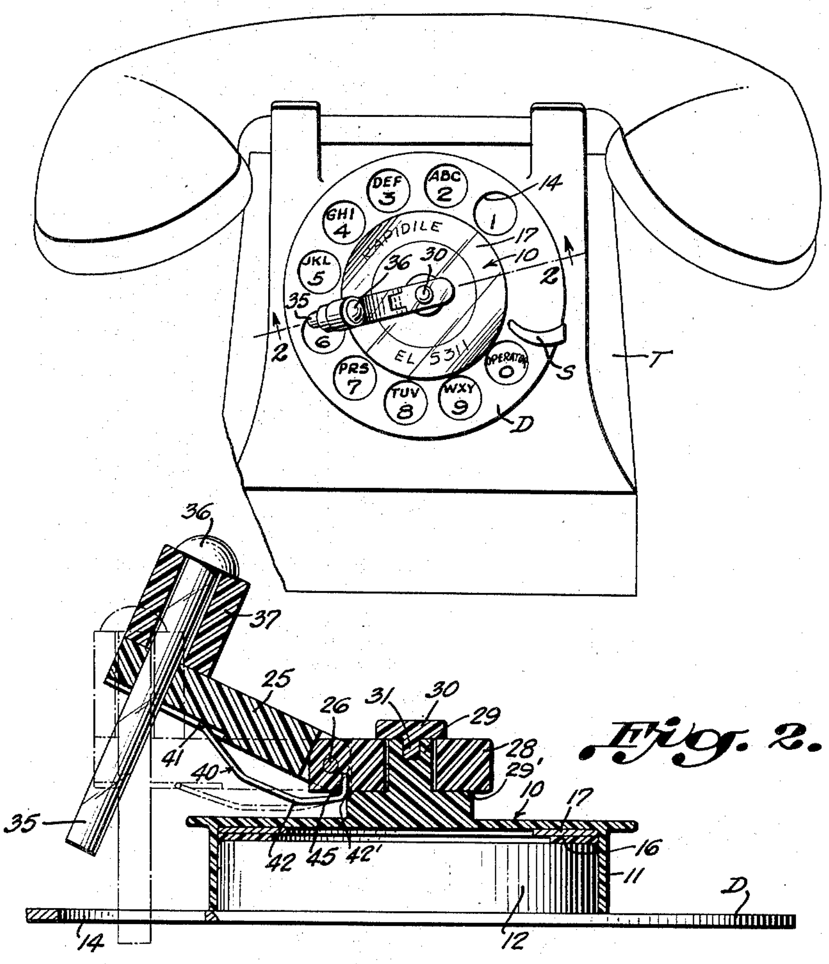
Fig. 2 is a vertical sectional view along line 2—2 of Fig. 1.

In Fig. 1 is shown an automatic telephone transmitter T of the conventional type having a saddle for receiving a combined transmitter and receiver and incorporating on the front face thereof an impulsing device for the purpose of dialing desired telephone exchanges and numbers. Such an impulsing device includes a rotatable dial plate D provided with circumferentially arranged openings 14 overlying a fixed dial plate bearing the desired indicia of letters and figures, which are necessary in the proper selection of the numbers of impulses required in the transmission of the proper signals to the central exchange stations. A finger stop S is shown mounted in fixed relation to the rotatable dial plate D in order to limit the clockwise motion of the rotatable dial plate in any of its selected movements so that the predetermined number of impulses may be transmitted in the course of its retrograde movement.

The invention is concerned with the provision of an attachment to such telephone transmitters in order to eliminate the need for the use of the finger or other instrument such as a pencil, which are usually inserted into the openings 14 to produce the rotary movement of the rotary dial plate to the limit controlled by the finger stop S. Such an attachment in accordance with the present invention is formed of a molded plastic shell 10 having the lateral wall 11 which is adapted to overlie the cap 12 generally provided at the center of the dial plate D and to engage therewith by a frictional fit, which in most cases requires a slight turning to effect the engagement and disengagement of the shell 10 with respect to the central cap 12.

In order to attain the maximum benefits of the present invention, the plastic shell is preferably formed of transparent resinous material, for example, styrene resins, in order that an advertising disc 17, of paper, cloth, metal, plastic or any other desired material, may be inserted on the inside of the top face 10 of the shell so as to be visible therethrough. This disc may bear the name and telephone number of any advertiser so that this information is available at all times to the user of the telephone. In view of the low cost of attachments produced in accordance with the present invention, the same could be distributed by advertisers at no cost to the telephone owner in order to gain the advantages of advertising a particular service, product, etc., which is illustrated in Fig. 1 with the trade-mark of the device, namely, Rapidile, but which could be modified to bear any other indicia, in a manner well known in the field of advertising.

A boss 29 is molded integrally with the shell 10 and extends upwardly from the center of the top face thereof. An articulated arm, composed of parts 25 and 28, is pivotally mounted upon the boss 29. The portion 28 of the articulated arm is apertured so that the same fits over the boss 29 with sufficient clearance to make it easily rotatable thereon. Thereafter the upper face of the boss is capped by inserting a head 30 with a pin 31 projecting therefrom into a corresponding recess in the top of the boss, the parts being integrated by dipping the pin in a solvent for the plastic. The portion 25 of the arm is hingedly mounted at its bifurcated end 25a to the portion 28 by the provision of a cylindrical metal pin 26 which is passed through aligned openings therefor in parts 25 and 28.

Figure 4:
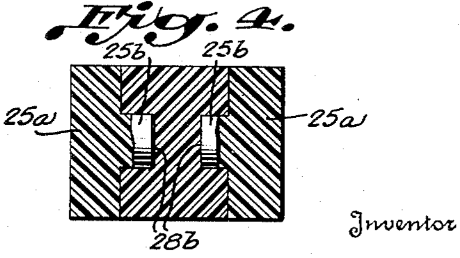
Fig. 4 is a sectional view of a modified form of hinge joint between the articulated portions of the dialing arm.

In the modified embodiment of the invention shown in Fig. 4, the hinged joint between the parts 25 and 28 is formed by plastic pintles 25b which are adapted to be pressed into corresponding openings in the end of arm 28. The parts 25 and 28 may be molded with the pintles and openings therein and the bifurcated arms 25a may be slightly spread in the heated state following the molding operation so that the pintles 25b may pass the narrowed end of arm 28 in their passage for engagement in the openings 28b, whereafter the pressing of the bifurcated ends 25a will bring the pintles within the openings for permanent hinged engagement following the cooling of the molded parts.

Figure 3:
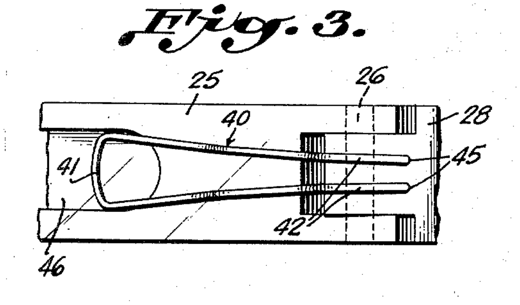
Fig. 3 is a bottom view of the articulated arm showing the manner of mounting the spring extending between the parts thereof.

The end of the portion 25 of the articulated arm is provided with a pin or projection 35 which extends downwardly from the engagement of the head 36 with a collar 37. Normally the pin or projection 35 is maintained in raised position as shown in solid lines in Fig. 2 by virtue of the metal spring 40 extending between the portions 25 and 28 of the articulated arm. This metal spring is preferably formed of light spring wire of symmetrical configuration of generally U-shaped outline (Fig. 3) having the closed end 41 resting in a recessed or undercut portion 46 on the bottom surface of arm 25 and the legs 40 terminating in short lengths 42 extending upwardly into a pair of openings 45 in the underside of portion 28, as shown in Figs. 2 and 3. The arrangement of this spring construction is such that it exerts a normal bias in an upward direction to maintain the parts in the position shown in solid lines in Fig. 2. A depression of the pin 35 by a downward engagement of the handle 37 brings the parts into the position shown in dotted lines, at which time the end 41 of the spring moves along the recess 46 towards pin 35. Another consequence of the depression of the arm 25 and a downward movement of the spring 40 is the pressing of the corners 42′ of the spring against the beveled surface 29′ of the boss 29 which ride along the bevel 29′ to exert a downward pressure on the shell 10 to help retain it in tight seating relation on the cylindrical cap 12. Also, the lower end of the pin 35 engages within one of the recesses 14, and by rotary manipulation of the handle 37, the articulated arm may be rotated in a clockwise direction until the pin 35 engages the stop S. The subsequent release of the arm 25 permits the projection 35 to be withdrawn from the opening by the action of spring 40, so that the dial is free to return to its original position by the spring incorporated in such devices. The handle or arm portions 25 and 28 move with the dial but the same may move freely relative thereto in order to selectively engage another opening by independent rotation of the arm relative to the shell when the projection 35 is in raised position. Since the portion 28 of the arm maintains at all times its position in a plane parallel to the upper surface of the shell, no deteriorating wear at the pivotal bearing takes place, resulting in a long useful life for the device.

In view of the fact that the diameter of the projection 35 is comparatively small relative to the size of the openings 14, the indicia in the respective openings may be viewed easily as an incident to the insertion of the projection 35 in the desired opening.

The attachment lends itself to mass production by molding from suitable plastics, the colors of which may be varied to match telephone instruments of corresponding or contrasting colors. The advertising disc 17 may assume fanciful outlines and configurations other than simple annuli; the same being held in place at all times by the retaining disc 16 presssed into the shell behind it.

In addition to the advertising media incorporated on the advertising disc on the under face of the plastic shell, a recess may be provided on the top face thereof for the accommodation of a suitable record bearer carrying the telephone number of the instrument to which it is applied.

While I have described my invention as embodied in a specific form and as operating in a specific manner for purposes of illustration, it should be understood that I do not limit my invention thereto, since various modifications will suggest themselves to those skilled in the art without departing from the spirit of my invention, the scope of which is set forth in the annexed claims.

I claim:

1. An attachment for an automatic telephone transmitter having a rotatable dial with a central cap and circumferentially arranged openings therearound, comprising a molded plastic shell mounted on said cap, a boss extending from the top of the center of said shell, an articulated arm having one portion thereof pivotally mounted on said boss and a second portion with one end thereof hingedly connected to said first portion about an axis normal to the axis of the pivotal mounting on said boss, a downward projection at the free end of said second portion adapted selectively to extend into one of said openings below the plane of said dial, and a spring mounted on the underside of said arm for normally maintaining said projection above the level of the plane of said dial.

2. An attachment as set forth in claim 1 wherein said articulated arm is formed of plastic material with the hinged mounting between the portions thereof formed by a metal pin extending through aligned openings in the juxtaposed ends of said portions.

3. An attachment as set forth in claim 1 wherein said articulated arm is formed of plastic material with the hinged mounting between the portions thereof formed by pintles on one of the portions extending into corresponding openings in the other portion.

4. An attachment as set forth in claim 1 wherein said articulated arm is formed of plastic material with the second portion at the hinged end formed with bifurcated ends and inwardly directed cylindrical pintles, and corresponding openings in the reduced end of said first portion adapted to have the pintles pressed thereinto to effect a hinged engagement therebetween.

5. An attachment for an automatic telephone transmitter having a rotatable dial with a central cap and circumferentially arranged openings therearound, comprising a shell of molded plastic material mounted on said cap, a boss extending from the top of the center of said shell, a laterally articulated arm having one portion thereof pivotally mounted on said boss and a second portion with one end thereof hingedly connected to said first portion, a handle with a downward projection at the free end of said second portion adapted selectively to extend into one of said openings below the plane of said dial, and a metal spring extending between said portions of said arms for normally biasing said projection above the level of the plane of said dial.

6. An attachment as set forth in claim 5 wherein said last-mentioned metal spring is fixed to one portion of said arm and is mounted on the other portion thereof for relative sliding movement.

7. An attachment as set forth in claim 5 wherein said last-mentioned metal spring is of thin steel wire fixed to one portion of said arm and engaged to the other portion thereof for relative movement therebetween.

8. An attachment as set forth in claim 5 wherein said last-mentioned metal spring is of thin wire of symmetrical configuration of U-shaped outline whereof the closed end is slidably mounted on a recess in the underside of the second portion of the articulated arm wherefrom it extends along the bottom thereof to terminate in juxtaposed upwardly extending extremities below said second portion, and a small bore in the bottom face of the first portion of the arm for receiving each of said spring extremities.

9. An attachment as set forth in claim 5 wherein said last-mentioned metal spring is of thin wire of symmetrical configuration of U-shaped outline whereof the closed end is slidably mounted on a recess in the underside of the second portion of the articulated arm wherefrom it extends along the bottom thereof wherefrom it is bent upwardly to terminate in juxtaposed upwardly extending extremities below said second portion, a small bore in the bottom face of the first portion of the arm for receiving each of said spring extremities, and an annular beveled surface on said boss against which the bent portion of the spring is pressed when the handle is moved downwardly.

MAURICE JOYCE.

REFERENCES CITED

The following references are of record in the file of this patent:

UNITED STATES PATENTS

| Number | Name | Date |
|---|---|---|
| 1,532,655 | Erickson | Apr. 7, 1925 |
| 1,575,353 | Magrath | Mar. 2, 1926 |
| 1,647,543 | Revelle | Nov. 1, 1927 |
| 1,671,102 | Dickman | May 29, 1928 |
| 1,900,916 | Currivan | Mar. 14, 1933 |
| 2,097,384 | Segeal | Oct. 26, 1937 |
| 2,088,688 | Casey et al. | Aug. 3, 1937 |
| 2,239,963 | Hoffert | Apr. 29, 1941 |
| 2,285,286 | Kirkman | June 2, 1942 |